United States Patent
Burch et al.

(10) Patent No.: US 11,687,439 B2
(45) Date of Patent: Jun. 27, 2023

(54) AUTOMATIC WINDOW GENERATION FOR PROCESS TRACE

(71) Applicant: PDF Solutions, Inc., Santa Clara, CA (US)

(72) Inventors: Richard Burch, McKinney, TX (US); Kazuki Kunitoshi, Chiba-ken (JP); Michio Aruga, Chiba-ken (JP); Nobichika Akiya, Kamakura (JP)

(73) Assignee: PDF Solutions, Inc., Santa Clara, CA (US)

( * ) Notice: Subject to any disclaimer, the term of this patent is extended or adjusted under 35 U.S.C. 154(b) by 72 days.

(21) Appl. No.: 17/383,325

(22) Filed: Jul. 22, 2021

(65) Prior Publication Data

US 2022/0027248 A1    Jan. 27, 2022

Related U.S. Application Data

(60) Provisional application No. 63/055,885, filed on Jul. 23, 2020.

(51) Int. Cl.
*G06F 11/00* (2006.01)
*G06F 11/34* (2006.01)

(52) U.S. Cl.
CPC ........ *G06F 11/348* (2013.01); *G06F 11/3452* (2013.01); *G06F 11/3457* (2013.01)

(58) Field of Classification Search
CPC ............................ G06F 11/348; G06F 11/3452
See application file for complete search history.

(56) References Cited

U.S. PATENT DOCUMENTS

| | | | | |
|---|---|---|---|---|
| 5,864,773 A | * | 1/1999 | Barna | G05B 23/0297 702/182 |
| 7,477,960 B2 | * | 1/2009 | Willis | G05B 19/4184 700/121 |
| 2003/0088542 A1 | * | 5/2003 | McGee | G06F 11/323 714/E11.181 |
| 2008/0154421 A1 | * | 6/2008 | Chang | G05B 19/4184 700/121 |
| 2008/0162524 A1 | * | 7/2008 | LaFrance-Linden | G06F 11/3466 707/999.102 |
| 2011/0041122 A1 | * | 2/2011 | Bondi | G06F 11/3452 717/131 |
| 2019/0340392 A1 | * | 11/2019 | Khorrami | G06F 21/57 |
| 2020/0014639 A1 | * | 1/2020 | Dhanabalan | H04L 49/501 |
| 2020/0104639 A1 | | 4/2020 | Didari et al. | |
| 2022/0222162 A1 | * | 7/2022 | Lin | G06F 18/217 |

OTHER PUBLICATIONS

International Search Report and Written Opinion of the ISA dated Oct. 26, 2021.

* cited by examiner

*Primary Examiner* — Amine Riad
(74) *Attorney, Agent, or Firm* — Dergosits & Noah LLP (57) ABSTRACT

Automatic definition of windows for trace analysis. For each process step, the trace data are aligned to both the start of the process step and the end of the process step, and statistics including rate of change are calculated from both the start of the process step and the end of the process step. Windows are generated based on analysis of the calculated statistics.

17 Claims, 14 Drawing Sheets

AUTOMATIC WINDOW GENERATION FOR PROCESS TRACE

CROSS REFERENCE

This application claims priority from U.S. Provisional Application No. 63/055,885 entitled Automatic Process Trace Window Definition using Stability and other Summary Statistics, filed Jul. 23, 2020, and incorporated herein by reference in its entirety.

TECHNICAL FIELD

This application relates to the use of process trace analysis for detection and classification of semiconductor equipment faults, and more particularly, to machine-based methods for automatically defining windows for process trace analysis.

BACKGROUND

The detection of equipment faults by monitoring time-series traces of equipment sensors is a long-recognized but very difficult problem in semiconductor manufacturing. Typically, a method for fault detection and classification ("FDC") starts with breaking a complex trace into logical "windows" and then computing statistics (frequently called indicators or key numbers) on the trace data in the windows. The indicators can be monitored using statistical process control ("SPC") techniques to identify features or anomalies based primarily on engineering knowledge, and can be utilized as inputs for predictive models and root cause analysis. However, the quality of the indicators determines the value of all subsequent analysis: high quality indicators require high quality window definition.

Conventionally, window definition is largely manual and is one of the key limitations and largest costs in the use of FDC techniques. Further, although there are existing automatic windowing algorithms, they typically require extensive manual intervention in order to produce high quality windows. Thus, it would be desirable to discover improved techniques for defining and using trace windows in FDC analysis schemes.

DETAILED DESCRIPTION

As used herein, the term "sensor trace" refers to time-series data measuring an important physical quantity periodically during equipment operation, e.g., the sampled value of a physical sensor at each time point. Note that the sampling rate can vary and the time period between samples is not always the same. The term "trace" or "equipment trace" refers to a collection of sensor traces for all important sensors identified for a particular processing instance. The term "step" refers to a distinct device processing period, e.g., one of the steps in a process recipe.

Figure 1A:
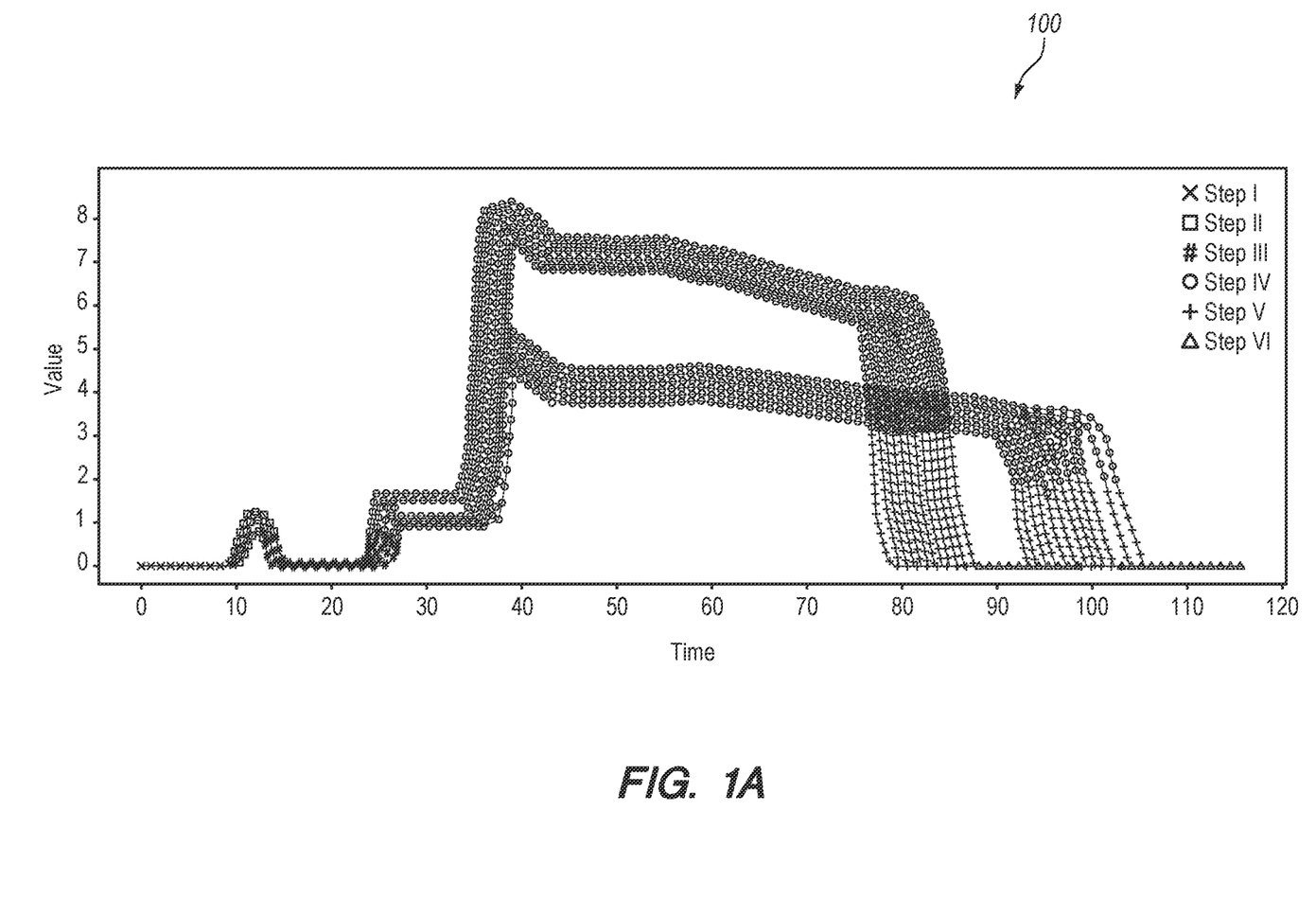
FIG. 1A is a graphical display of trace data obtained over time for multiple steps of a semiconductor manufacturing process.

Referring to FIG. 1A, an illustrative graphical plot 100 of trace data is presented representing data taken from 400 individual traces, i.e., time-series values from individual sensors, taken during six distinct steps I-VI of a semiconductor fabrication process. Sensor values are plotted on the y-axis versus actual elapsed time in seconds measured on the x-axis starting from the beginning of step I. Each step of the process is represented as a unique icon in FIG. 1A to better illustrate and distinguish sensor behavior, particularly at transition periods. It is noted that while a process step normally starts at a specific point in time, the length of the step may be variable during different runs of the process.

From a simple visual observation of the sensor data over time in FIG. 1A, the problem with calculating basic statistical indicators should be evident, namely, the statistical measures simply cannot provide a complete picture of the sensor activity, particularly where a trace value is changing quickly. For example, there is clearly a lot going on in step IV, and the basic statistical measures cannot fully account for that activity.

Step I runs from t=0 to approximately t=10 seconds, with nominal sensor values. Step II runs from approximately t=10 to t=13, with sharply rising then sharply falling sensor values. Step III runs from approximately t=13 to t=25, with falling sensor values at the start and rising sensor values at the end and a stable period of nominal sensor values between approximately t=17 to t=22.

Step IV has the longest period of any of these steps, extending from approximately t=25 to t=100; but with significant transitions occurring during the start and end of this step, with some sensor traces beginning to drop off at about t=75 while the last of the sensor traces drop off at t>100, evidencing a clear time distinction between one group of sensor traces falling off between approximately t=75 and t=85 and a second group of sensor traces falling off between approximately t=90 and t=100 as the sensor values spread further apart in time due to the variance in step time. A long stable period also exists between roughly t=45 to t=75.

In Step V, the sensor traces transition to nominal value in two different time groups, and in Step VI, the sensor traces are stable with nominal values in two different time groups.

Figure 1B:
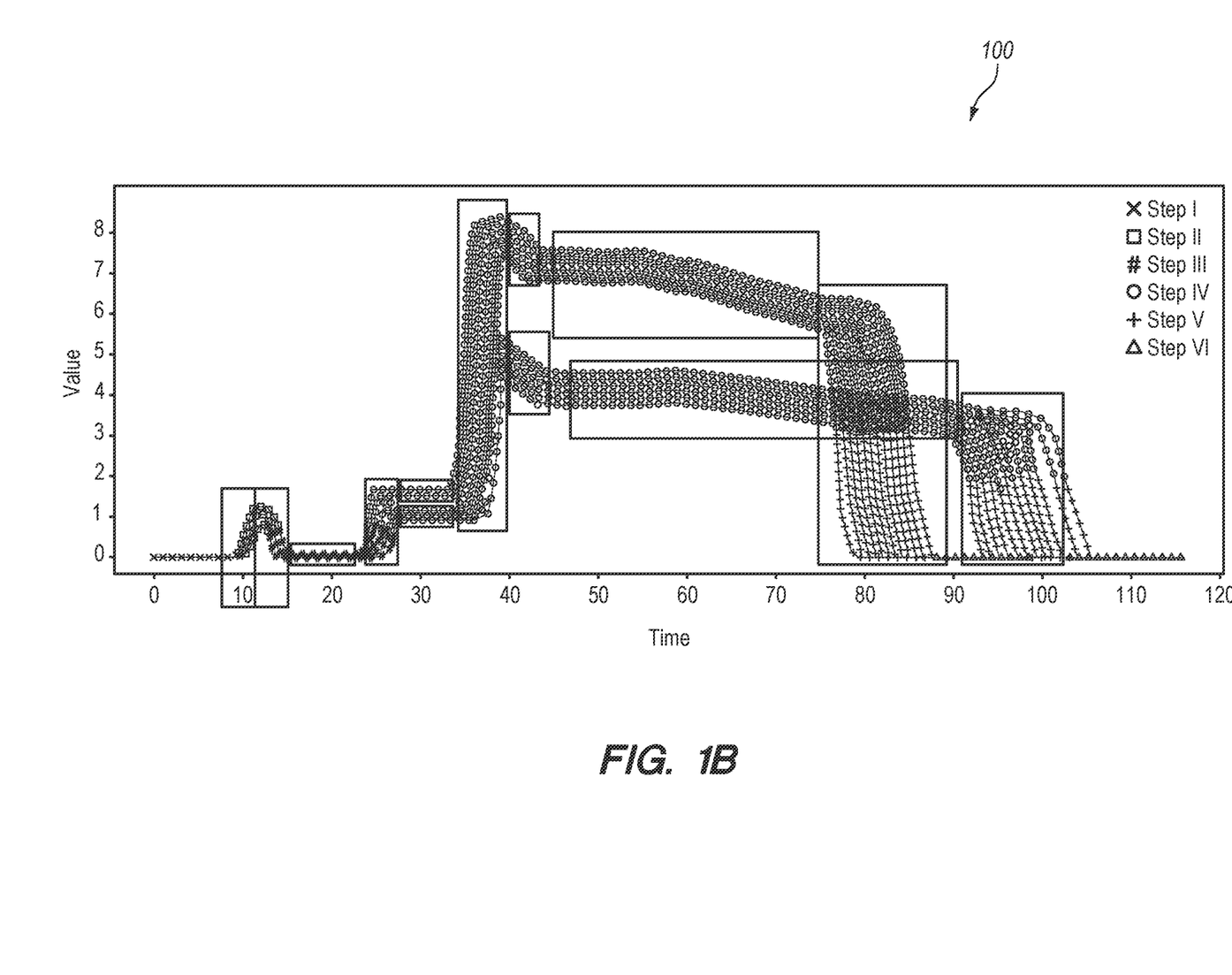
FIG. 1B is the graphical display of FIG. 1A with windows defined over trace data.

In a conventional approach, technical staff manually establish windows based simply on a visual review of the graphical results, generally looking to define windows manually where (i) the trace data is stable, and (ii) the rate of change is the same. For example, given those objectives, FIG. 1B illustrates example windows imposed manually upon regions where either the trace data is stable or the rate of change is the same.

Figure 2:
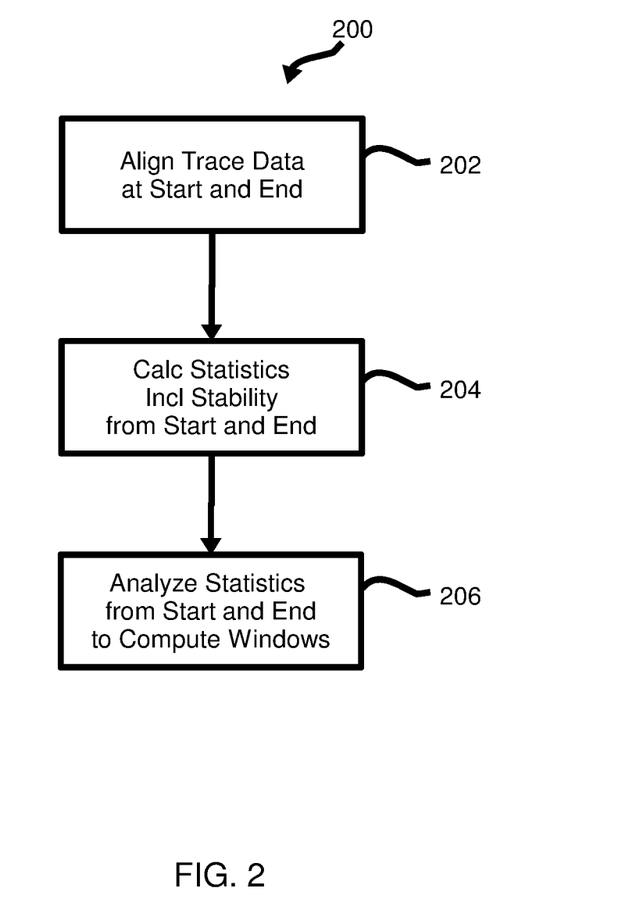
FIG. 2 is a flow chart illustrating a process for automatically defining windows.

FIG. 2 shows one embodiment of a method 200 for automatically defining windows useful for evaluating trace data. In item 202, the trace data for each process step is aligned, in a first instance, from the start of the process step, and in a second instance, from the end of the process step. To "align" the data to the start of the process step, subtract the minimum time for each sensor trace within that process step from each value of the sensor trace within that process step. Then, interpolate the time variable of all sensor traces to a constant time step, call this "StepTime." To "align" the data to the end of the process step, subtract the maximum value of StepTime for each sensor trace from all values of StepTime for that sensor trace, and call this "remStepTime."

In item 204, statistics are calculated from both the start and end of each process step. In particular, a novel definition of stability is included in the calculated statistics. In item 206, the windows are computed by analyzing the statistics from both the start and end of the steps. Each item of method 200 will now be described in more detail.

Figure 3A:
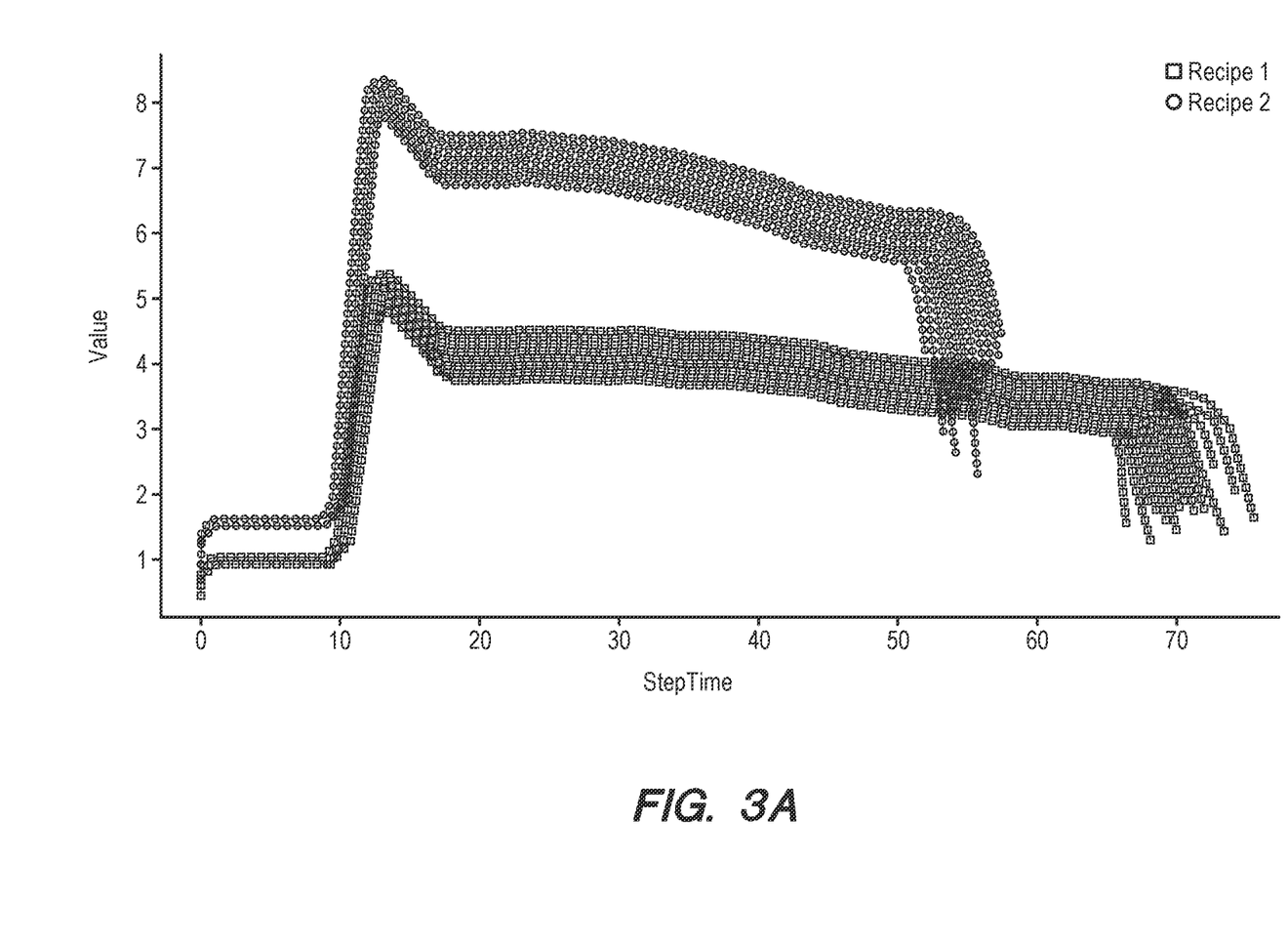
FIG. 3A is a graphical display of data from step IV of FIG. 1A aligned to the beginning of step IV.
Figure 3B:
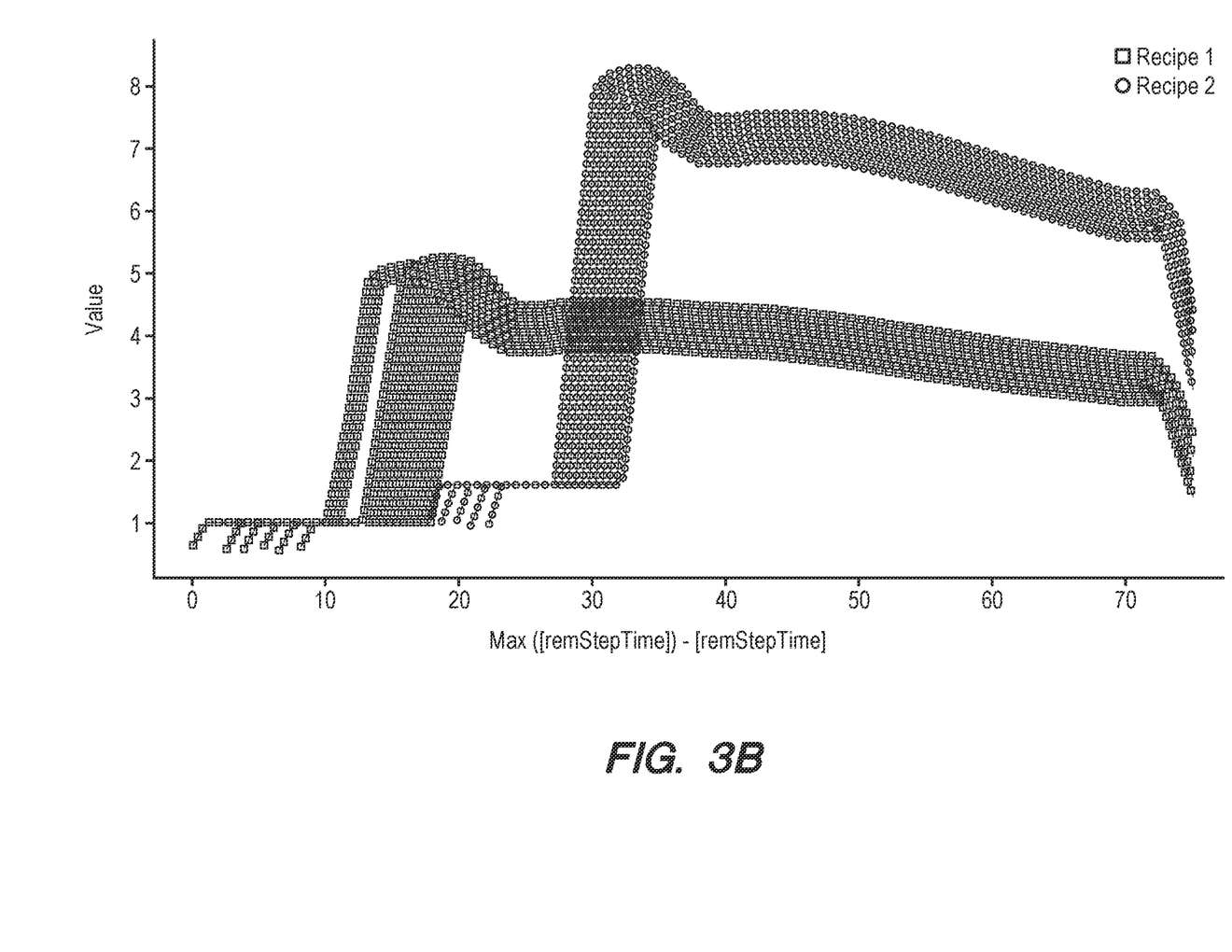
FIG. 3B is a graphical display of data from step IV of FIG. 1A aligned to the end of step IV.

For example, FIGS. 3A and 3B show the results of method item 202. In FIG. 3A, the sensor data from step IV for two different recipes is still plotted on the y-axis but all values are aligned in time to the start of the step. Similarly, in FIG. 3B, the sensor data values from step IV are aligned in time from the end of the step. The advantage of analyzing windows from both the start and end of the trace is obvious when observing the aligned data. Since the processing time or length of a step is variable, it should be clear from the example of FIGS. 3A and 3B that statistics for the first part of the trace can be best calculated from the beginning of the trace, and likewise, statistics for the last part of the trace can be best calculated from the end of the trace.

The second key to effective automatic window definition is to calculate statistics in item 204 for each time point of each process step from both the start and the end of the step. By building summary statistics in both directions, it is possible to identify optimal windows even though the step varies in time from trace to trace. Numerous statistics can prove useful including but not limited to median, mean, standard deviation (including robust estimates) and estimated slope.

Figure 4A:
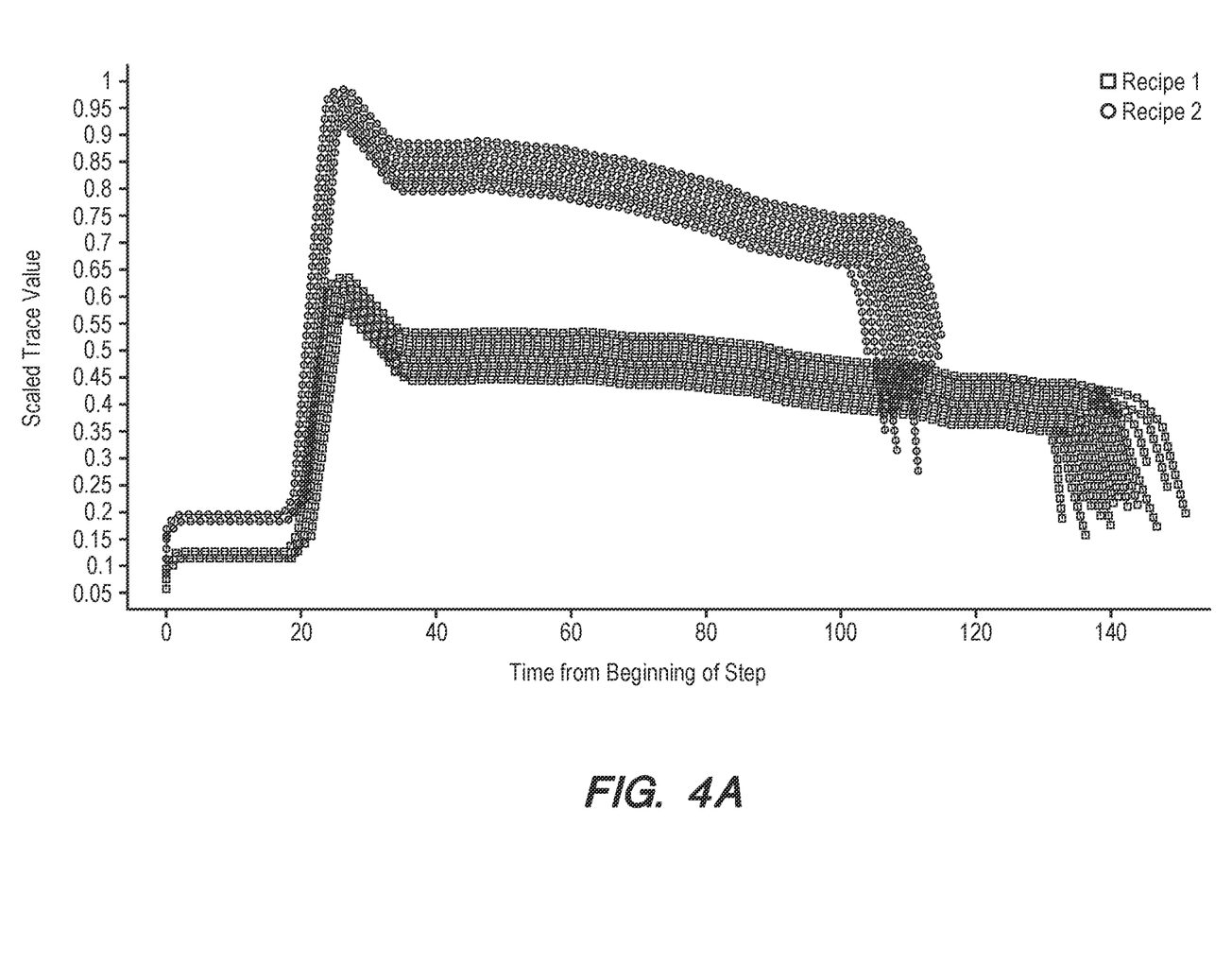
FIG. 4A is a graphical display of scaled data taken from FIG. 3A and aligned to the beginning of step IV.
Figure 4B:
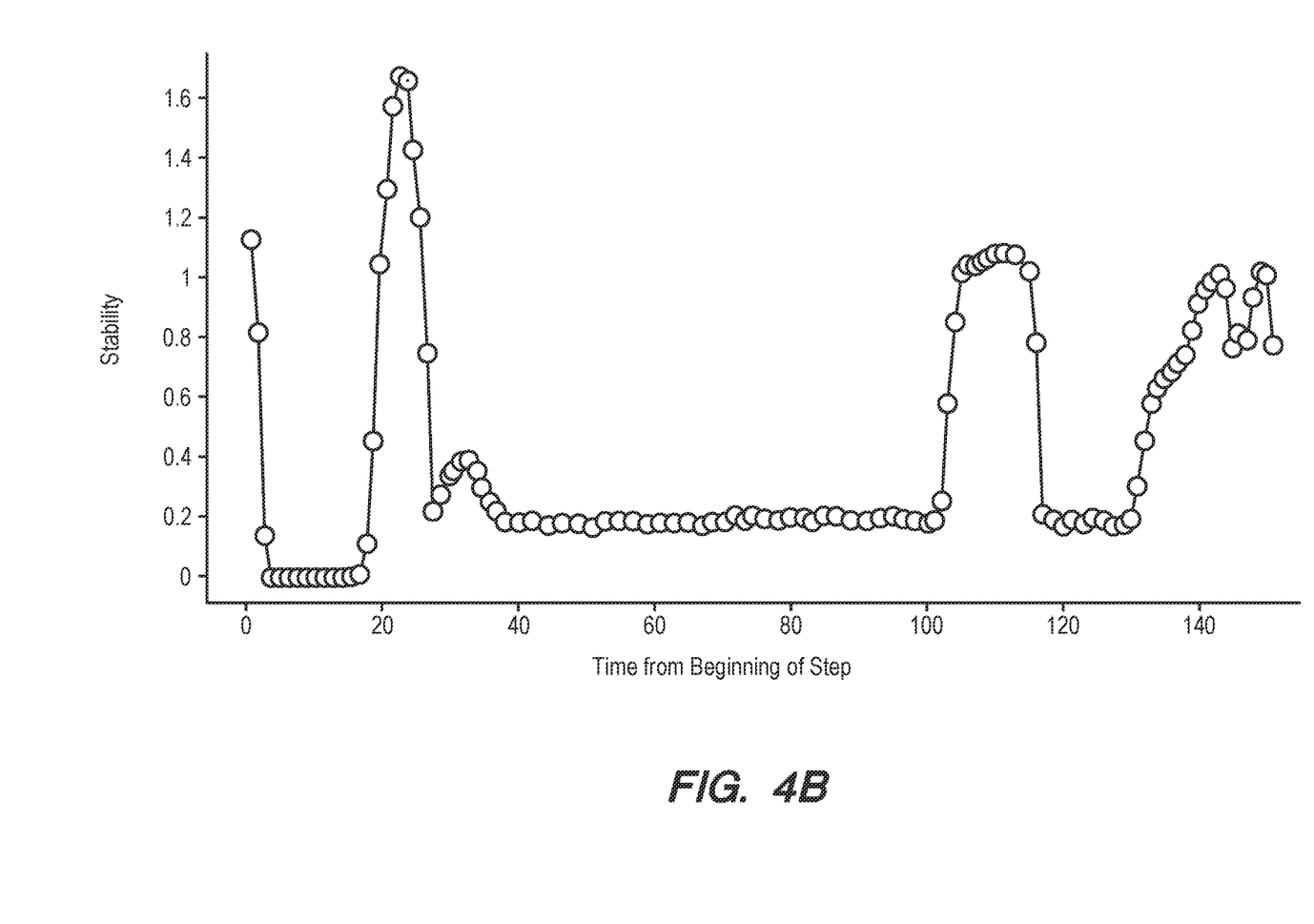
FIG. 4B is a graphical display of the rate of change or stability for the sensor data at each time point in FIG. 4A.
Figure 5A:
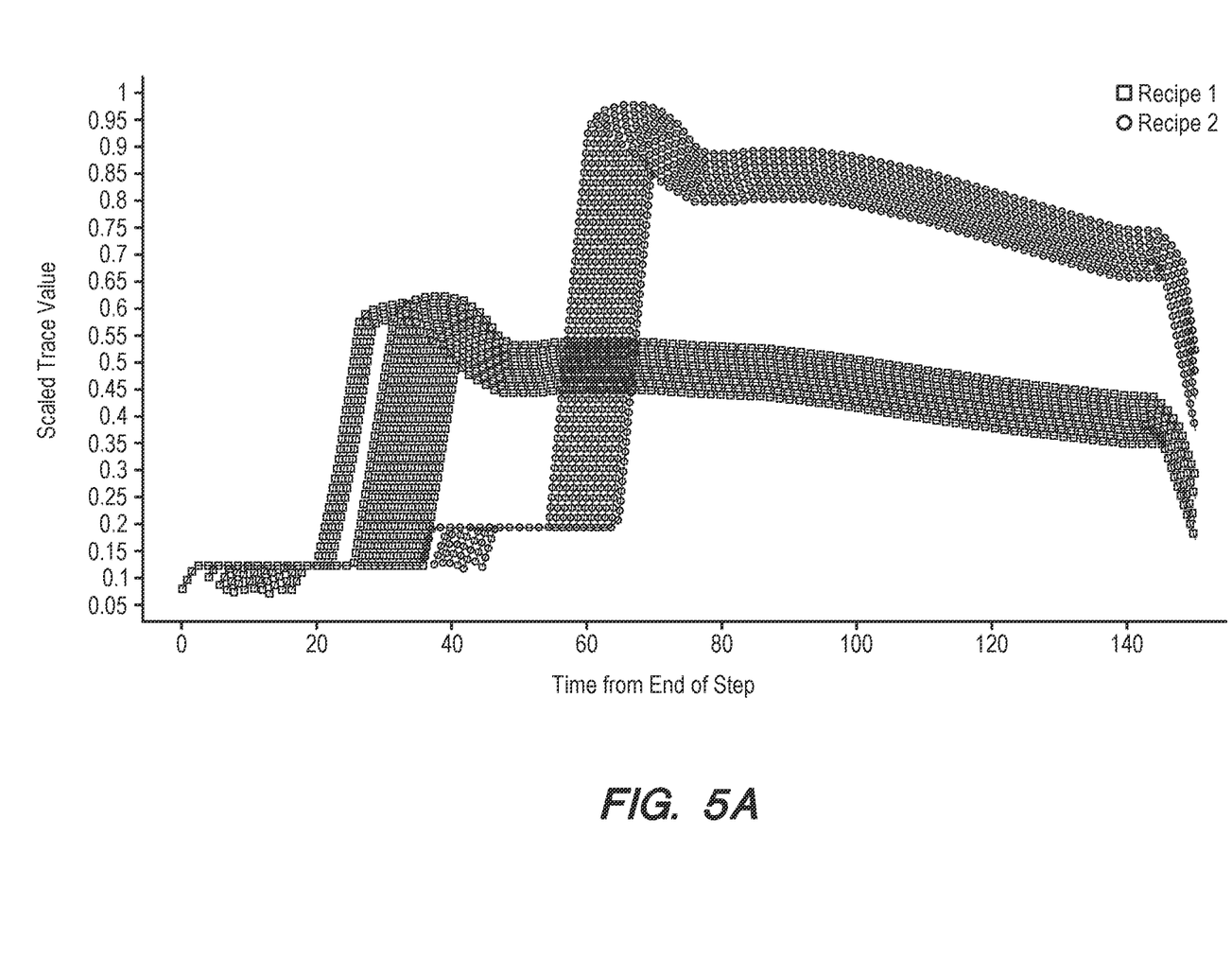
FIG. 5A is a graphical display of scaled data taken from FIG. 3B and aligned to the end of step IV.
Figure 5B:
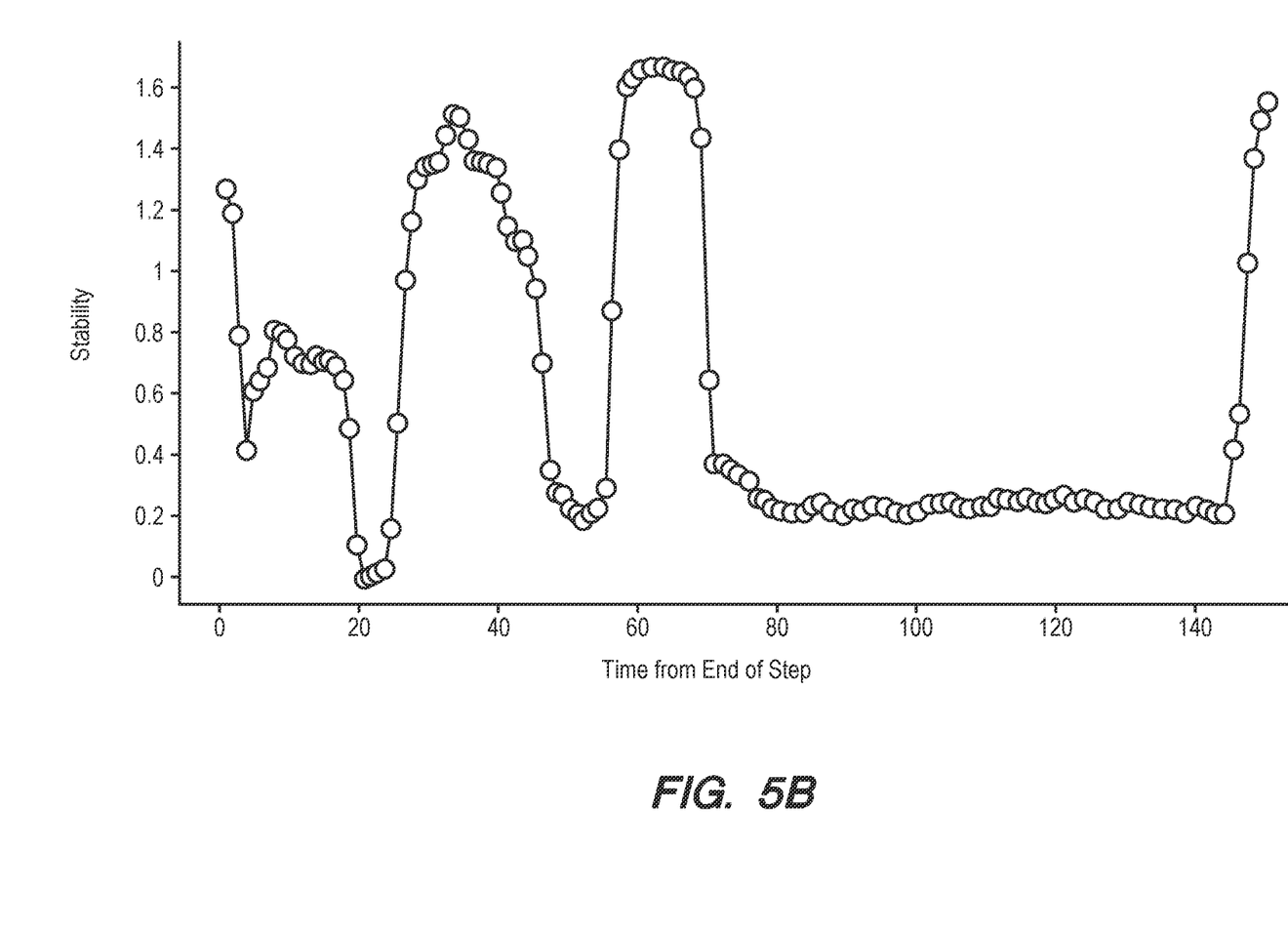
FIG. 5B is a graphical display of the rate of change or stability for the sensor data at each time point in FIG. 5A.

One additional statistic that is both key and novel for building effective windows is an estimation of the rate of change for the traces at each time point. For the purposes of this disclosure, this estimate of rate of change will be called "stability" herein and is the best indicator for separating transition windows from stable windows. For example, FIG. 4A illustrates the trace data plotted as aligned from the start of the step, similar to FIG. 3A, except that here the sensor values on the y-axis are scaled from 0 to 1 and plotted relative to the step time or length of the step so that the rate of change, i.e., stability, is comparable between sensors with widely varying magnitudes. This scaled sensor value is then used to compute all statistics to make it easier to evaluate those statistics without considering the original range of the sensor. Based on the data in FIG. 4A, the rate of change for each trace is estimated and FIG. 4B shows the corresponding plot for the estimated stability over the same step-aligned time frame, aligned to the start of the step. Similarly, FIG. 5A illustrates the scaled trace data of step IV plotted as aligned from the end of the step, and FIG. 5B shows the corresponding stability plot over the same step-aligned frame, aligned to the end of the step.

If the sensor trace is smoothly varying, then the rate of change is simply the maximum of the absolute value of the differences in the scaled sensor values between the current time value and the previous and next values divided by the standard time step. The stability can be the rate of change or some monotonic transformation of the rate of change. If the trace is not smoothly varying due to replicated data points or inherent noise, the calculation of rate of change may require more complicated algorithms based on the specific requirements.

It is apparent from observation of the stability plots that the sensor readings appear stable (low value) at the start of the step (FIG. 4B) from about t=3 to t=18 and from t=38 to t=100; however, in viewing the data from the end of the step (FIG. 5B), the sensor readings appear stable from about t=80 to t=140.

Figure 6:
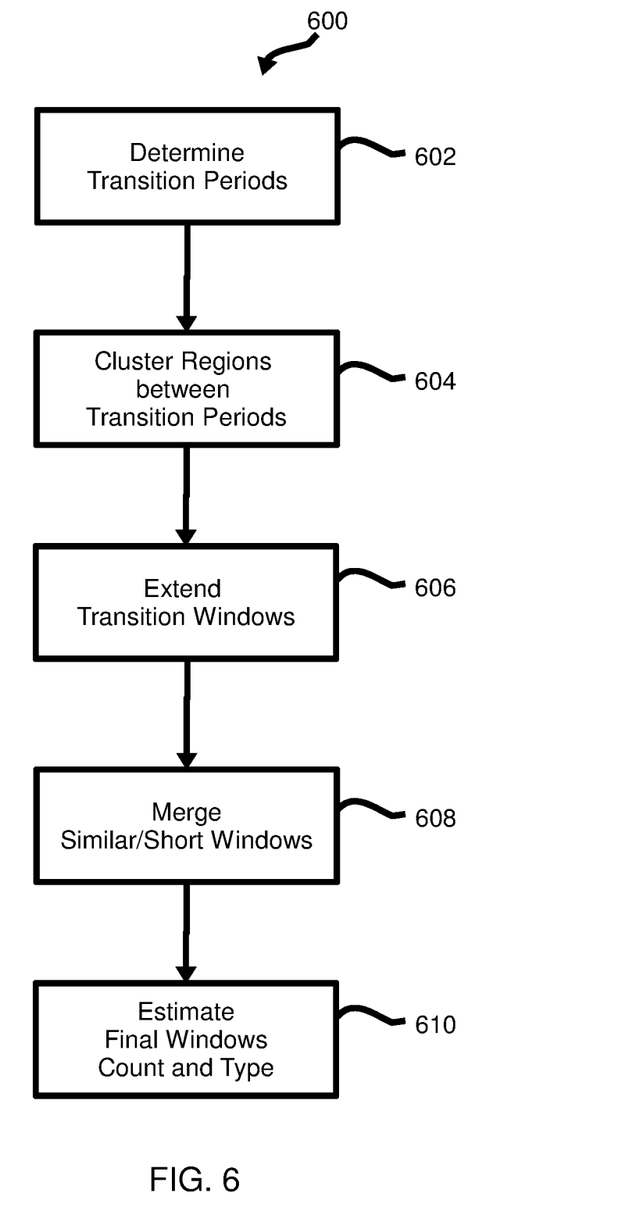
FIG. 6 is a flow chart illustrating a process for automatically computing windows.

Following calculation of statistics in item 204, windows are computed in step 206 by analyzing statistics from both the start and end of each step. FIG. 6 illustrates one method 600 for using the statistics to compute the windows, and corresponding graphical results are depicted in FIGS. 7A-7D. In FIGS. 7A-7D, twenty-eight traces showing anomalous behavior were added to the data represented in FIG. 1A in order to demonstrate the ability for the auto-windowing process to deal with anomalous traces in the training data set.

Figure 7A:
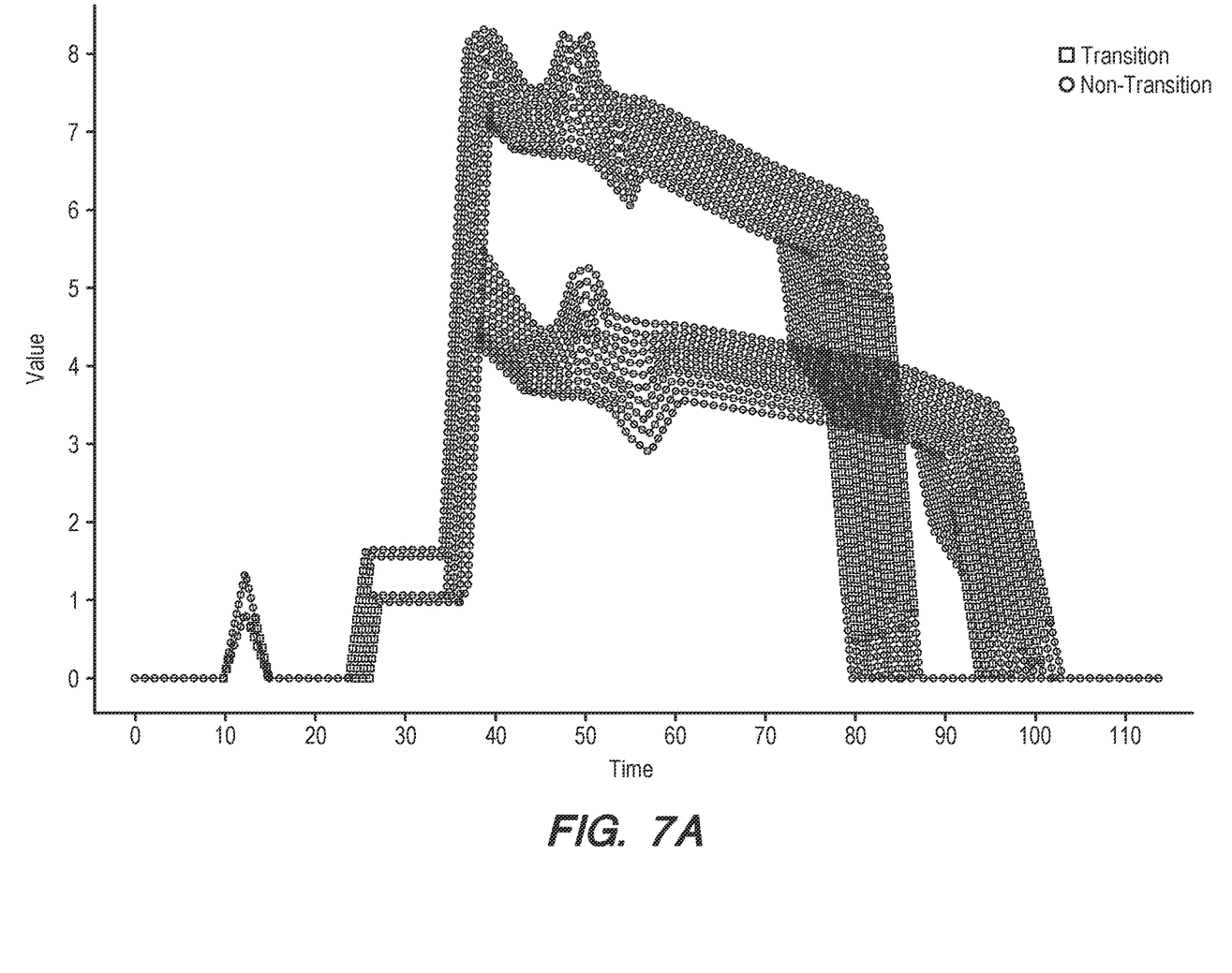
FIG. 7A is a graphical display of the result of performing the first step in the process of FIG. 6 on the trace data from FIG. 1A.

In item 602, transition periods at the start and end of each step are determined, namely, regions where the traces are changing rapidly. This can be done by analyzing the stability and median values calculated in item 204 of method 200. FIG. 7A shows the results of analyzing the statistics for the trace data, where five windows for transition regions are shown by the square icon and six windows for non-transition regions are shown by the circle icon.

Figure 7B:
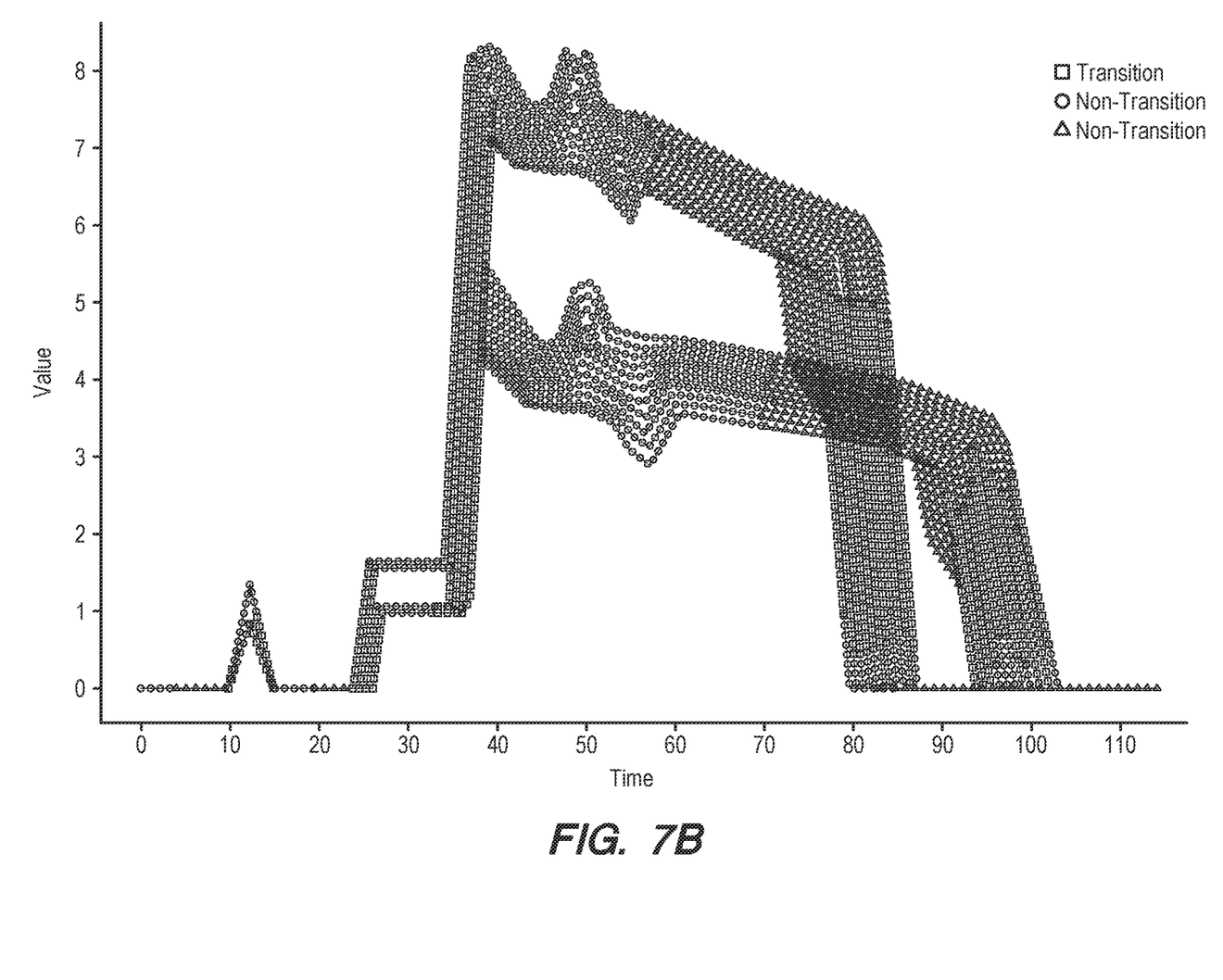
FIG. 7B is a graphical display of the result of performing the second step in the process of FIG. 6 on the trace data from FIG. 7A.

All the regions between the transition periods are then clustered in item 604 to group together adjacent points having similar stability values. This item identifies internal transitions. For example, FIG. 7B shows the result of clustering adjacent data points on the basis of similar stability values. This item results in an additional transition window and some split of non-transition windows as compared to FIG. 7A.

Figure 7C:
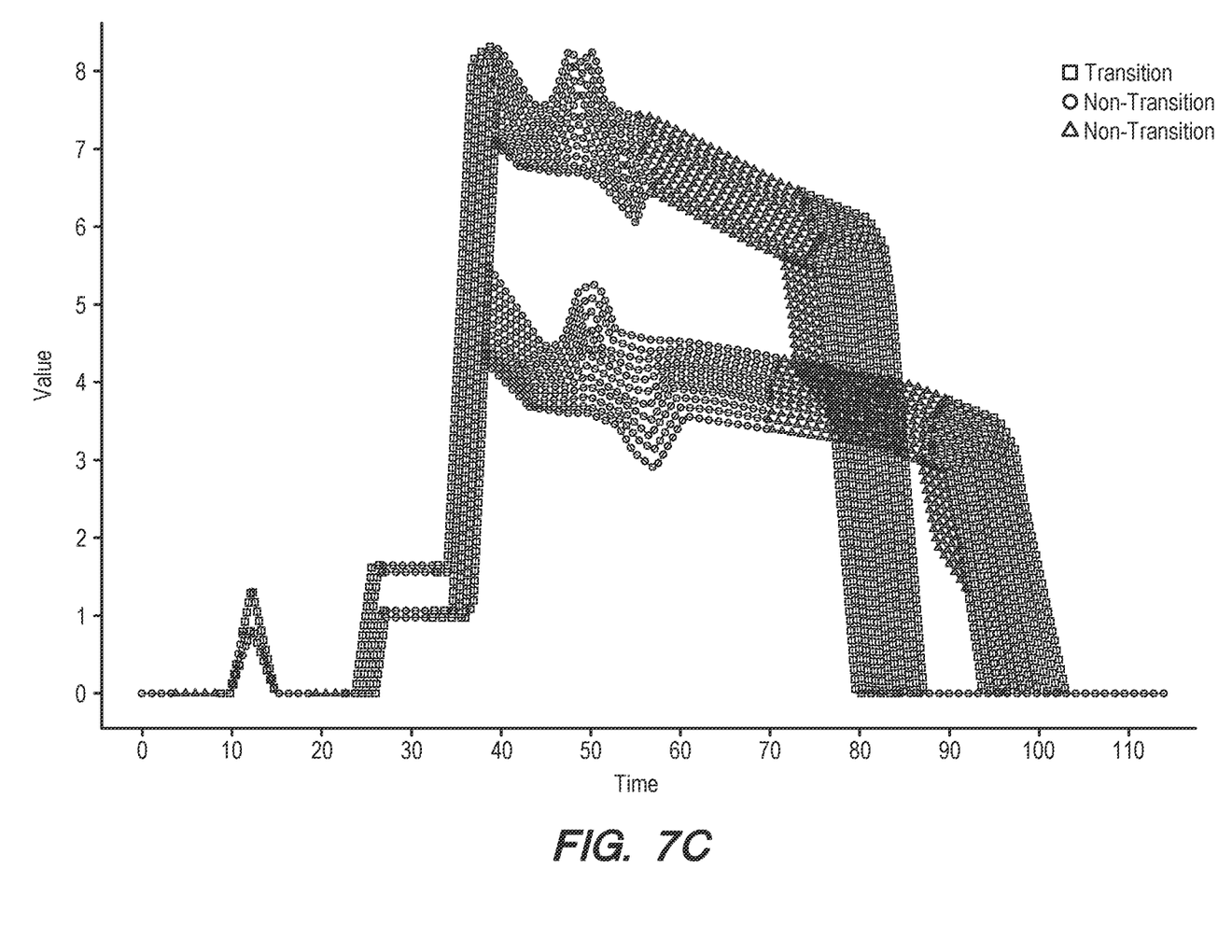
FIG. 7C is a graphical display of the result of performing the third step in the process of FIG. 6 on the trace data from FIG. 7B.

Ideally, transition windows should be windows with rapidly changing data between windows having relatively stable data. In item 606, the transition windows are extended by relatively small amounts to approach that goal, as shown in FIG. 7C, for example, by including additional points having small differences in the rate of change/stability factor.

Figure 7D:
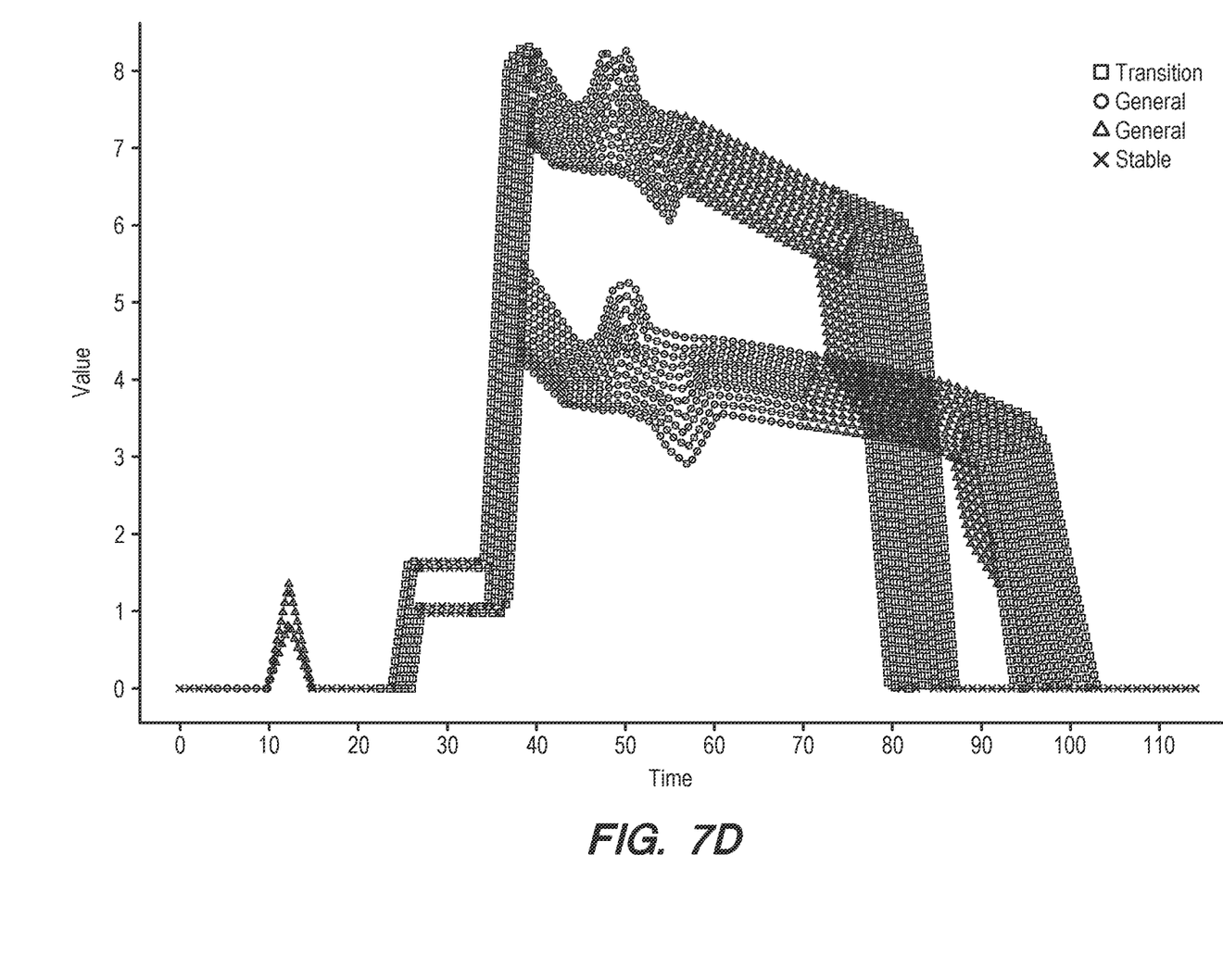
FIG. 7D is a graphical display of the result of performing the fourth step in the process of FIG. 6 on the trace data from FIG. 7C.

In item 608, similar windows and very short windows are merged with neighbors to reduce window count, and in item 610, final window count and types are estimated based on statistics of points within the window. The result is shown in FIG. 7D with eleven windows of three distinct types: four transition windows are defined by the square icons; three stable windows are defined by the circle icons; and four general windows (not stable, not transitions) are defined by the triangle icons.

The window types assigned in the item 610 allow for statistical indicators to be customized to maximize the quality of the calculated indicators and to minimize the number of indicators generated.

The automatic generation of trace windows is facilitated by the emergence of parallel processing architectures and the advancement of Machine Learning algorithms which allow users to model problems and gain insights and make predictions using massive amounts of data at speeds that make such approaches relevant and realistic. Machine Learning is a branch of artificial intelligence that involves the construction and study of systems that can learn from data. These types of algorithms, and along with parallel processing capabilities, allow for much larger datasets to be processed, and are much better suited for multivariate analysis in particular.

The creation and use of processor-based models for automatic windowing can be desktop-based, i.e., standalone, or part of a networked system; but given the heavy loads of information to be processed and displayed with some interactivity, processor capabilities (CPU, RAM, etc.) should be current state-of-the-art to maximize effectiveness. In the semiconductor foundry environment, the Exensio® analytics platform is a useful choice for building interactive GUI templates. In one embodiment, coding of the processing routines may be done using Spotfire® analytics software version 7.11 or above, which is compatible with Python object-oriented programming language, used primarily for coding machine language models.

The foregoing description has been presented for the purpose of illustration only—it is not intended to be exhaustive or to limit the disclosure to the precise form described. Many modifications and variations are possible in light of the above teachings.

The invention claimed is:

1. A method for automatic window definition for analysis of semiconductor equipment trace data, comprising:
   receiving a plurality of sensor traces from a plurality of equipment sensors during a plurality of process steps of a semiconductor process;
   for each respective step of the plurality of process steps:
      aligning each sensor trace to a start of the respective step;
      calculating a first rate of change for each sensor trace aligned to the start of the respective step;
      aligning each sensor trace to an end of the respective step; and
      calculating a second rate of change for each sensor trace aligned to the end of the respective step; and
   defining a plurality of windows for bounding and analyzing the sensor traces in each window based primarily on the first and second rates of change calculated for each of the plurality of sensor traces.

2. The method of claim 1, the defining step further comprising:
   defining a first type of window to bound sensor traces in at least a first region where the first rate of change or the second rate of change is increasing or decreasing more than a threshold; and
   defining a second type of window to bound sensor traces in at least a second region where the first rate of change or the second rate of change do not exceed the threshold.

3. The method of claim 1, further comprising:
   for each of the calculating steps:
      performing a first set of other statistical calculations for each sensor trace aligned to the start of the respective step; and
      performing a second set of other statistical calculations for each sensor trace aligned to the end of the respective step; and
   defining the plurality of windows based on the first and second rates of change calculated and the first and second sets of other statistical calculations for each of the plurality of sensor traces.

4. The method of claim 1, further comprising:
   scaling each of the plurality of sensor traces prior to the aligning steps.

5. The method of claim 3, the defining step further comprising:
   identifying a plurality of transition periods at the start and the end of each process step;
   in between the plurality of transition periods, clustering the input data to group together sensor traces having similar rates of change;
   extending the plurality of transition periods; and
   merging similar windows in the transition periods and in between the transition periods.

6. The method of claim 5, the step of identifying transition periods further comprising:
   identifying regions where values of the plurality of sensor traces are changing rapidly.

7. The method of claim 5, the step of extending transition periods further comprising:
   incorporating small portions of adjacent regions where values of the plurality of sensor traces are changing less rapidly into transition periods.

8. A method for automatic window definition in the analysis of semiconductor equipment trace data, comprising:
   receiving trace data obtained from a plurality of semiconductor equipment sensors, the trace data associated with a plurality of process steps in a semiconductor process;
   aligning the trace data for each process step, in a first instance, to a start of the process step, and in a second instance, to an end for the process step;
   calculating statistics including rate of change for the first instances and second instances of aligned trace data for each process step; and
   generating a plurality of windows for the trace data from analysis of the calculated statistics for the aligned trace data.

9. The method of claim 8, the generating step further comprising:
   identifying a plurality of transition periods at the start and at the end of each process step;
   in between the plurality of transition periods, clustering trace data to group together trace data having similar rates of change;
   extending the plurality of transition periods; and
   merging similar windows.

10. The method of claim 9, the step of identifying transition periods further comprising:
    identifying regions where the plurality of sensor traces are changing rapidly.

11. The method of claim 10, the step of extending transition periods further comprising:
    incorporating small portions of adjacent regions where the sensor traces are changing less rapidly into transition periods.

12. The method of claim 8, further comprising:
    scaling the trace data to the aligning steps.

13. A method for automatic window definition in the analysis of semiconductor equipment trace data, comprising:
    receiving trace data obtained from a plurality of semiconductor equipment sensors, the trace data associated with a plurality of steps in a semiconductor process;
    for each step of the semiconductor process:

align the trace data associated with the step to the start of the step;

calculate statistics including rate of change for the trace data aligned at the start of the step;

align the trace data associated with the step to the end of the step;

calculate statistics including rate of change for the trace data aligned at the end of the step;

analyzing the calculated statistics for the trace data aligned at the start of the step and the trace data aligned at the end of the step; and computing windows for the trace data based on the analysis of the calculated statistics.

14. The method of claim 13, the step of computing windows further comprising:

identifying a plurality of transition periods at the start and at the end of each process step;

in between the plurality of transition periods, clustering trace data to group together trace data having similar rates of change;

extending the plurality of transition periods; and merging similar windows.

15. The method of claim 14, the step of identifying transition periods further comprising:

identifying regions where the plurality of sensor traces are changing rapidly.

16. The method of claim 15, the step of extending transition periods further comprising:

incorporating small portions of adjacent regions where the sensor traces are changing less rapidly into transition periods.

17. The method of claim 13, further comprising:

scaling the trace data prior to the aligning steps.

* * * * *